March 27, 1934.  W. A. BULGER  1,952,362
AIR CONDITIONING APPARATUS
Filed July 9, 1932   2 Sheets-Sheet 1
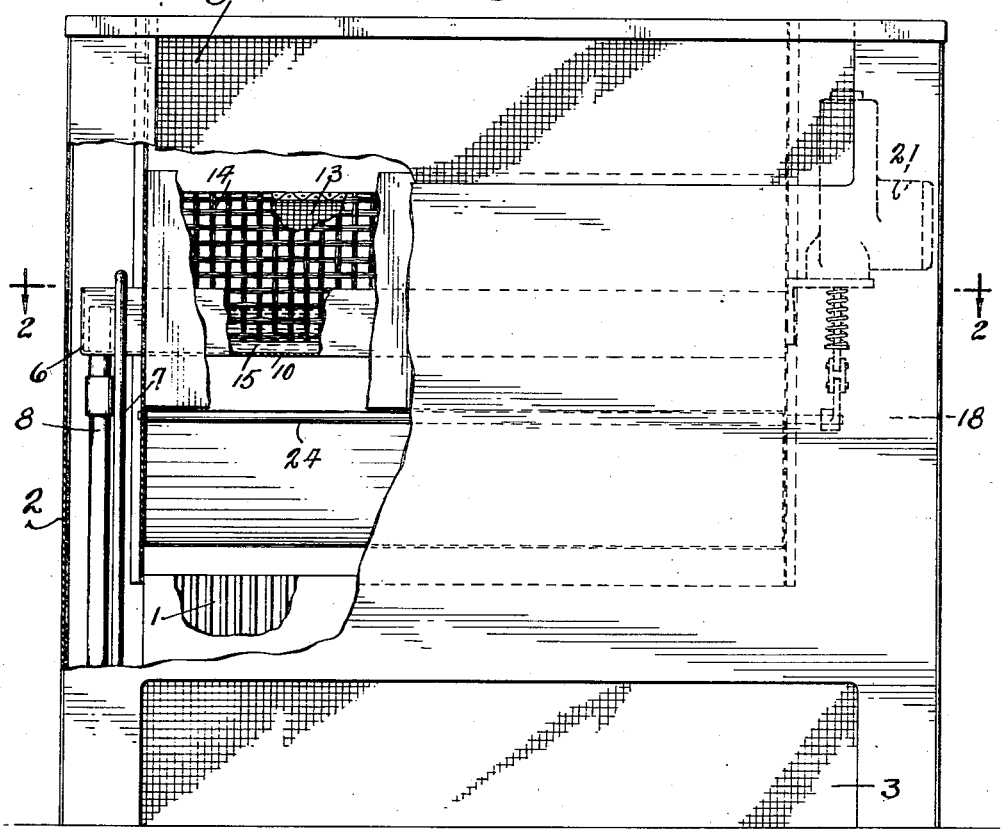
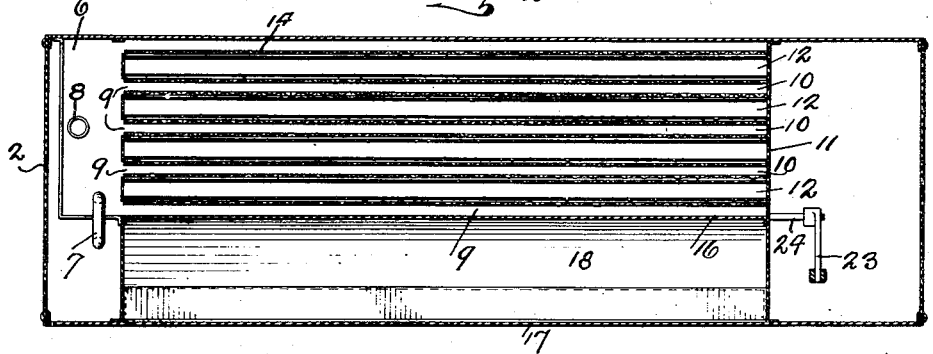
INVENTOR.
William A. Bulger
BY
Kiddle, Margeson and Harnidge
ATTORNEYS.

March 27, 1934. W. A. BULGER 1,952,362
AIR CONDITIONING APPARATUS
Filed July 9, 1932 2 Sheets-Sheet 2
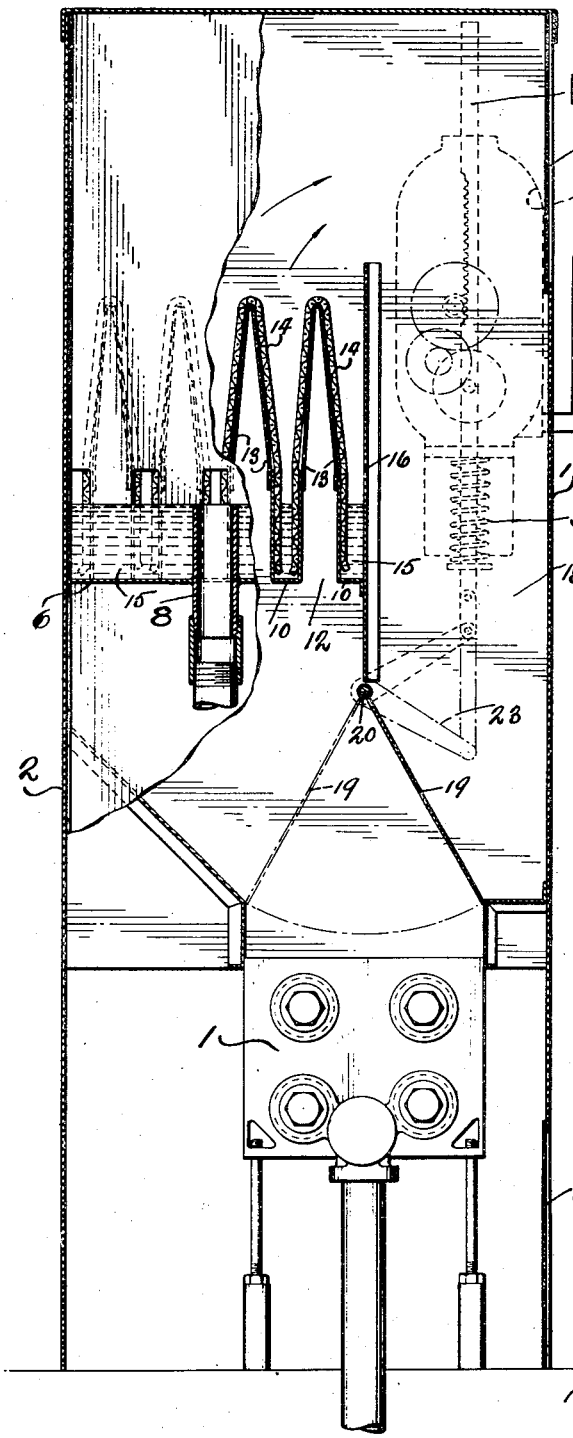
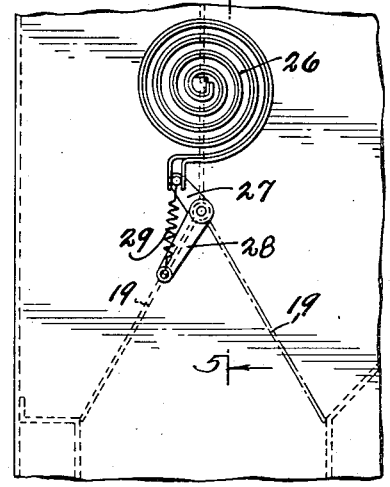
INVENTOR.
BY William A. Bulger.
Riddle, Marquis and Harnidge
ATTORNEYS.

Patented Mar. 27, 1934

1,952,362

UNITED STATES PATENT OFFICE 1,952,362

AIR CONDITIONING APPARATUS

William A. Bulger, Chicago, Ill., assignor to Petroleum Heat and Power Company, New York, N. Y., a corporation of Delaware Application July 9, 1932, Serial No. 621,542

1 Claim. (Cl. 261—104)

The present invention is directed to air conditioning apparatus.

One of the objects of my invention is the provision of air conditioning apparatus adapted for installation in connection with a radiating heating system in which a humidostat is employed for controlling moisture conditions of the air, this humidostat controlling a damper arrangement whereby the air after flowing through and over a radiator is controlled in direction so that if the moisture content of the air is not sufficiently high the air will be diverted so as to flow through a humidifier, the humidifier being by-passed if the moisture content of the air is correct.

In the drawings accompanying this application wherein I have shown an embodiment of my invention:

Fig. 1 is an elevational view partly in section of my improved apparatus;

Fig. 2 is a section on the line 2—2 of Fig. 1;

Fig. 3 a section on the line 3—3 of Fig. 1;

Fig. 4 is a modified form of damper control; and

Fig. 5 is a section on the line 5—5 of Fig. 4.

Referring to the drawings in detail and first of all to Figs. 1, 2 and 3, 1 designates a radiator of any desired type, enclosed in a cabinet 2 provided with any suitable form of mesh work or reticulated inlet 3 adjacent the bottom.

Adjacent the upper end of the cabinet 2 is a mesh work or reticulated outlet 5.

Within the cabinet 2 above the radiator 1 I provide a water pan 6, this pan as will be seen from Figs. 1 and 3 being in the form of a shallow rectangular reservoir supported in any convenient fashion and equipped with filling pipe 7 connected to a suitable water supply and with water level or overflow pipe 8 to insure that the pan will always be maintained filled to the proper height with water.

The inner wall of the pan 6 is slotted as shown at 9 and to the inner wall of the pan abreast of these slots I secure tanks or troughs 10, the ends of these troughs remote from the inner wall of the pan 6 being closed by a wall 11. This provides a series of spaced water troughs in constant communication with the pan 6.

Overlying each of the air passages 12 provided by the spacing of the troughs 10 is a metal network support 13 secured in any suitable manner to the walls of the troughs for the support of wicks 14 in the form of any suitable fabric, the lower ends of which are constantly immersed in the water 15 in the troughs 10. In this way the wicks 14 are always kept moist and by means of mechanism presently to be described the air passing over the radiator 1, if too dry, must pass through these wicks before discharging from the cabinet 2 at the outlet 5.

16 designates a vertically extending plate or wall which constitutes a continuation of one wall of the pan 6 and this plate or wall 16 as will be seen from Fig. 2 is spaced from the front wall 17 of the cabinet 2 to provide a passageway 18 for air passing over the radiator 1 and on its way to the outlet 5 of the cabinet. This passageway 18 is controlled by a damper 19 pivoted at 20. This damper when in the dotted line position of Fig. 3 prevents the air from passing through the wicks 14, the air under these conditions passing upwardly through the passageway 18. With the damper in the full line position of Fig. 3 all of the air must pass upwardly through the passages 12 and wicks 14 before reaching outlet 5.

The damper 19 is automatically actuated by a torque motor 21 controlled by a humidostat 22 which may be placed in any suitable location in a room, the air of which is to be conditioned.

The function of the humidostat 22, as will be apparent, is to make or break an electrical contact in the circuit of the torque motor in response to moisture variations in the air of a room. Rack R of the torque motor 21 is provided with a spring S and is connected at its lower extremity to a lever 23 mounted on a rod 24 which in turn is connected to the damper 19. When the motor is energized the rack R moves vertically placing the spring S under compression and at the same time rocking the rod 24 through the lever 23 thereby causing the damper 19 to move alternately to the full line position of Figure 3 when the moisture in the air of the room is below a predetermined point or to the dotted line position of Figure 3 when the moisture in the air of a room is at or above the predetermined point.

While I have shown the damper 19 actuated by a torque motor 21, I do not wish to limit myself strictly to the use of a torque motor as this damper may be actuated by any suitable means such as a solenoid, for example, or other suitable electro magnetic device. I find, however, that motors commercially known as torque motors are particularly well adapted for the control of the damper 19 inasmuch as the circuit of torque motors may remain closed for an extended period of time even though the motor is at rest without overheating. Consequently in the present instance the torque motor 21 may be energized by the humidostat 22 to move the damper 19 to the full line position shown in Fig. 3, holding the damper in this position until the moisture content of the air in the room has reached a predetermined point whereupon the humidostat 22 will open the circuit of the motor 21 which has been held closed during this period and allow the spring S to move the rack R of the torque motor in a direction to move the damper 19 to the dotted line position of Fig. 3.

It will be seen from the foregoing therefore, that I have provided a device adapted for maintaining a predetermined moisture content in the air of a room in which my apparatus is installed, my device being automatic in its operation and requiring absolutely no attention whatsoever inasmuch as the water in the pan 6 from which the troughs 10 are filled or kept filled is maintained at a predetermined level at all times, the pipe 7 as already pointed out being connected to a suitable source of water supply.

It will be appreciated that after dirt and other foreign material has accumulated on the wicks 14 it is a simple matter to simply remove these wicks and replace them with fresh ones.

In Figures 4 and 5 I have shown a modification of my invention to the extent that I have replaced the humidostat 22 and torque motor 21 with a device 26 which consists essentially of a laminated strip built up of two dissimilar materials, said strip being formed into a spiral with one end of the spiral fixed and the other end connected to a lever 27. One of the two dissimilar materials in the spiral strip forming the device 26 is of a hygroscopic nature, that is, it is affected by moisture so that changes in the moisture content of the air coming in contact with the device 26 will cause this material to elongate or shorten thereby causing the device 26 to coil up about its fixed center or uncoil as the case may be, depending upon air conditions to move the lever 27 to the left or right, as viewed in Figure 4, thereby actuating another lever 28 which corresponds to lever 23 of Figure 3 and which will be attached to the damper 19 as before.

Spring 29 is attached to the two levers 27 and 28 so that when the device 28 which is attached to the lever 27 moves the lever 27 either to the right or left, as viewed in Fig. 4, the spring 29 will be extended and placed under tension upon reaching dead center and when the levers have passed dead center the spring will contract and thereby rock the rod 20' to cause the damper 19 to snap from one extreme position to the other, thereby insuring at all times movement of the damper to its limit of travel.

In general the operation of this modification of my invention is the same as that of Figs. 1, 2 and 3.

What I claim is:—

Air conditioning apparatus comprising in combination, air humidifying apparatus, an enclosure therefor having an outlet and a single inlet, a directioning device within said enclosure for controlling the direction of travel of the air entering said enclosure through said inlet, said directioning device when in one position directing air through the humidifier, and when in another position directing it to one side of the humidifier, a torque motor within said enclosure attached to said directioning device to actuate the same, means remote from the enclosure and controlled by the air remote from the enclosure for controlling the circuit of said motor, energization of said motor effecting movement of said direction device to one limit of its travel, and means operative upon de-energizing of said motor to move the directioning device to its other limit of travel.

WILLIAM A. BULGER.